US008511987B2

(12) United States Patent
Reinhardt et al.

(10) Patent No.: US 8,511,987 B2
(45) Date of Patent: Aug. 20, 2013

(54) ENGINE BEARING SUPPORT (75) Inventors: Gregory E. Reinhardt, South Glastonbury, CT (US); Enzo DiBenedetto, Kensington, CT (US); Jason W. Mazanec, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/524,527

(22) Filed: Jun. 15, 2012

(65) Prior Publication Data
US 2012/0257960 A1 Oct. 11, 2012

Related U.S. Application Data (63) Continuation-in-part of application No. 12/622,535, filed on Nov. 20, 2009.

(60) Provisional application No. 61/498,515, filed on Jun. 17, 2011, provisional application No. 61/593,181, filed on Jan. 31, 2012.

(51) Int. Cl.
*F02C 7/06* (2006.01)
*F01D 25/16* (2006.01)

(52) U.S. Cl.
USPC .................................................. 415/229

(58) Field of Classification Search
USPC .................. 415/229, 230, 232, 110, 111, 142
See application file for complete search history.

(56) References Cited

U.S. PATENT DOCUMENTS

| | | | |
|---|---|---|---|
| 3,754,484 A | 8/1973 | Roberts | |
| 5,433,674 A | 7/1995 | Sheridan et al. | |
| 6,223,616 B1 | 5/2001 | Sheridan | |
| 6,233,616 B1* | 5/2001 | Reid | 709/225 |
| 7,591,754 B2 | 9/2009 | Duong et al. | |
| 7,654,075 B2 | 2/2010 | Udall | |
| 7,694,505 B2 | 4/2010 | Schilling | |
| 7,824,305 B2 | 11/2010 | Duong et al. | |
| 7,926,260 B2 | 4/2011 | Sheridan et al. | |
| 8,205,432 B2 | 6/2012 | Sheridan | |
| 2005/0254945 A1* | 11/2005 | VanDuyn | 415/229 |
| 2007/0084188 A1* | 4/2007 | Orlando et al. | 60/204 |
| 2008/0098717 A1* | 5/2008 | Orlando et al. | 60/226.1 |
| 2009/0056343 A1 | 3/2009 | Suciu et al. | |
| 2009/0092487 A1 | 4/2009 | McCune et al. | |
| 2011/0123326 A1 | 5/2011 | Dibenedetto et al. | |

OTHER PUBLICATIONS

Michael Cusick, "Avco Lycoming's ALF 502 High Bypass Fan Engine," SAE Technical Paper 810618, 1981, doi:10.4271/810618, Society of Automotive Engineers, Inc., Warrendale, PA.

(Continued)

*Primary Examiner* — Edward Look
*Assistant Examiner* — Jesse Prager
(74) *Attorney, Agent, or Firm* — Bachman & LaPointe, P.C.

(57) ABSTRACT

A turbofan engine comprises an engine case. A gaspath extends through the engine case. A fan has a circumferential array of fan blades. A fan case encircles the fan blades radially outboard of the engine case. A plurality of fan case vanes extend outward from the engine case to the fan case. A front frame assembly includes a plurality of vanes extending radially across the gaspath. A transmission couples a shaft to a fan shaft to drive the fan. A bearing assembly couples the shaft to the front frame assembly. A bearing support extends aftward and radially inward from the front frame assembly to the bearing assembly.

13 Claims, 8 Drawing Sheets

(56) References Cited

OTHER PUBLICATIONS

Karl R. Fledderjohn, "The TFE731-5: Evolution of a Decade of Business Jet Service," SAE Technical Paper 830756, 1983, doi:10.4271/830756, Society of Automotive Engineers, Inc., Warrendale, PA.

T. A. Dickey. and E.R. Dobak, "The Evolution and Development Status of the ALF 502 Turbofan Engine," SAE Technical Paper 720840, 1972, doi:10.4271/720840, Society of Automotive Engineers, Inc., Warrendale, PA.

Jane's Aero-Engines, Ivchenko-Progress AI-727M, 2011, IHS Global Limited, Coulsdon, United Kingdom.

Jane's Aero-Engines, Rolls-Royce M45H, IHS Global Limited, Coulsdon, United Kingdom.

Jane's Aero-Engines, Turbomeca Aubisque, IHS Global Limited, Coulsdon, United Kingdom.

Jane's Aero-Engines, Aviadvigatel D-110, IHS Global Limited, Coulsdon, United Kingdom.

Jane's Aero-Engines, Honeywell LF502, IHS Global Limited, Coulsdon, United Kingdom.

Jane's Aero-Engines, Honeywell LF507, IHS Global Limited, Coulsdon, United Kingdom.

Jane's Aero-Engines, Honeywell TFE731, IHS Global Limited, Coulsdon, United Kingdom.

Jane's Aero-Engines, lychenko-Progress D-727, IHS Global Limited, Coulsdon, United Kingdom.

Jane's Aero-Engines, lychenko-Progress D-436, IHS Global Limited, Coulsdon, United Kingdom.

Applicant-Admitted Prior Art: Flight International, Avco Lycoming ALF502F-2 Cutaway, 2007, http://www.flightglobal.com/airspace/media/aeroenginesjetcutaways/avco-lycoming-alf502r-2-cutaway-5582.aspx.

Applicant-Admitted Prior Art: Flight International, Lycoming LF507F Cutaway, 2007, http://www.flightglobal.com/airspace/media/aeroenginesjetcutaways/avco-lycoming-alf502r-2-cutaway-5582.aspx.

Applicant-Admitted Prior Art: Flight International, Garrett TFE531 Cutaway, 2007,http://www.flightglobal.com/airspace/media/aeroenginesjetcutaways/avco-lycoming-alf502r-2-cutaway-5582.aspx.

NASA Conference Publication 2077, "Quiet, Powered-Lift Propulsion", Conference held at Lewis Research Center, Cleveland, Ohio, Nov. 14-15, 1978, pp. 79-81.

Jane's Aero-Engines, Edited by Bill Gunston, Issue Seven, Mar. 2000, pp. 510-512, United Kingdom.

Applicant-Admitted Prior Art: V2500 Fact Sheet, International Aero Engines, http://i-a-e.com/wp-content/uploads/2012/03/facts.pdf Jun. 15, 2012.

Applicant-Admitted Prior Art: Diagram "GE 90 Engine Airflow" http://ctr-sgi1.stanford.edu/CITS/ge90.html downloaded Jun. 15, 2012.

Applicant-Admitted Prior Art: TFE 731-20 PR Sheet, http://design.ae.utexas.edu/subjet/work/TFE731_4.jpg downloaded Jun. 15, 2012.

Applicant-Admitted Prior Art: Rolls Royce Trent 800, cutaway view, http://www.epower-propulsion.com/epower/gallery/ABP-RR%20Trent%20800%20cutaway.htm downloaded Jun. 15, 2012.

Applicant-admitted prior art: Rolls-Royce Trent cutaway view from http://web.mit.edu/aeroastro/labs/gtl/early_GT_history.html downloaded Jun. 15, 2012.

Applicant-admitted prior art: Garrett TFE 731-3 sectional view from http://perso.ovh.net/~caeaxtke/fr/coll/falcon50_5.html downloaded Jun. 15, 2012.

Applicant-admitted prior art: Rolls-Royce Trent 1000 cutaway view from http://hackedgadgets.com/2011/08/02/how-to-build-a-rolls-royce-trent-1000-jet-engine-used-in-the-boeing-787/ downloaded Jun. 15, 2012.

Applicant-admitted prior art: Rolls-Royce Trent cutaway view from http://www.warandtactics.com/smf/planet-earth-the-serious-stuff-non-mil-news/a-380-emergency-landing!/ downloaded Jun. 15, 2012.

* cited by examiner

FIG. 8

ENGINE BEARING SUPPORT

CROSS-REFERENCE TO RELATED APPLICATIONS

This is a Continuation-in-Part of Ser. No. 12/622,535, filed Nov. 20, 2009, and entitled "Bellows Preload and Centering Spring for a Fan Drive Gear System" and benefit is claimed of U.S. Patent Application Ser. No. 61/498,515, filed Jun. 17, 2011, and entitled "Fan Rotor Support" and U.S. Patent Application Ser. No. 61/593,181, filed Jan. 31, 2012, and entitled "Engine Bearing Support", the disclosures of which are incorporated by reference herein in their entireties as if set forth at length.

BACKGROUND

The disclosure relates to gas turbine engines. More particularly, the disclosure relates to turbofan engines with speed reducing transmissions. A complicating factor in any engine design is the need to enable the engine to flex sufficiently while at the same time accounting for tension loads and torsional stresses experienced by the engine while in flight.

SUMMARY

One aspect of the disclosure involves a turbofan engine comprising an engine case. A gaspath extends through the engine case. A fan has a circumferential array of fan blades A fan case encircles the fan blades radially outboard of the engine case. A plurality of fan case vanes extend aftward and outward from the engine case to the fan case. A front frame comprises a plurality of vanes radially across the gaspath. A transmission couples a shaft to a fan shaft to drive the fan. A bearing assembly couples the shaft to the front frame. A bearing support extends aftward and radially inward from the front frame assembly to the bearing assembly.

In any of the foregoing or following embodiments, the shaft may additionally or alternatively be a low pressure speed shaft.

In additional or alternative embodiments of any of the foregoing embodiments, the shaft is a flex-shaft.

In additional or alternative embodiments of any of the foregoing embodiments, the bearing support has a main portion tapering at an angle of 10-45° off-axial.

In additional or alternative embodiments of any of the foregoing embodiments, the bearing support has a main portion tapering at an angle of 10-35° off-axial.

In additional or alternative embodiments of any of the foregoing embodiments, the bearing support extends partially within a hub of a compressor.

In additional or alternative embodiments of any of the foregoing embodiments, the compressor may be a low pressure compressor (LPC). Further, the LPC may have a single hub.

In additional or alternative embodiments of any of the foregoing embodiments, the bearing assembly is a duplex bearing.

In additional or alternative embodiments of any of the foregoing embodiments: the duplex bearing comprises a forward bearing and an aft bearing; the forward bearing has a center spaced apart from a center of the aft bearing by a bearing distance; and the duplex bearing has a characteristic diameter, a ratio of said bearing distance to said characteristic diameter being between about 0.4:1 and about 3:1.

In additional or alternative embodiments of any of the foregoing embodiments: the duplex bearing comprises a forward bearing and an aft bearing; the forward bearing has a center spaced apart from a center of the aft bearing by a bearing distance; and the forward bearing has an inboard race longitudinally cantilevered by a cantilever distance at least about 20% of said bearing distance.

In additional or alternative embodiments of any of the foregoing embodiments: the duplex bearing comprises a forward bearing and an aft bearing; and the forward bearing has a center spaced apart from a center of the aft bearing by a bearing distance; and the forward bearing has an outboard race longitudinally cantilevered by a cantilever distance at least about 20% of said bearing distance.

In additional or alternative embodiments of any of the foregoing embodiments: the duplex bearing comprises a forward bearing and an aft bearing; and the forward bearing has a center spaced apart from a center of the aft bearing by a bearing distance; and an inboard support at a center of the bearing distance is longitudinally cantilevered by a cantilever distance at least about 10% of said bearing distance.

In additional or alternative embodiments of any of the foregoing embodiments: the duplex bearing comprises a forward bearing and an aft bearing; and the forward bearing and aft bearing are both tapered roller bearings.

In additional or alternative embodiments of any of the foregoing embodiments: a fan bearing assembly couples a forward hub structure to the fan shaft; and the fan bearing assembly is a duplex tapered roller bearing assembly and a bellows spring engages an outer race of at least one of the bearings of the duplex tapered roller bearing.

In another embodiment, a method for assembling an engine is provided. This method includes, among other possible steps: coupling a bearing assembly to a shaft; coupling a bearing support, that extends forward and radially outward from the bearing assembly, to a front frame assembly; coupling a transmission to the shaft; and coupling a fan to the transmission.

In additional or alternative embodiments of the foregoing method, the coupling the bearing assembly to the shaft and the coupling the transmission to the shaft may comprise installing, as a unit, a module comprising the bearing support, the bearing assembly and the transmission. In further embodiments, the module may further include one to all of a fan hub, a fan shaft coupled to the fan hub by one or more bearings, the front frame, and a flexible coupling for connecting the transmission to the shaft. In additional or alternative embodiments of any of the foregoing embodiments, such a module may be installed with a low pressure compressor rotor already installed on the engine. In additional or alternative embodiments of any of the foregoing embodiments, such a module may be installed with the fan case and structural guide vanes already installed on the engine. In additional or alternative embodiments of any of the foregoing embodiments, the fan may be installed by said coupling of the fan to the transmission after such a module is installed.

In additional or alternative embodiments of any of the foregoing embodiments, disassembly may be in an opposite order.

In an additional or alternative embodiment of the foregoing method, the fan may have a circumferential array of fan blades. Further, the step of coupling the fan to the transmission may include coupling a fan case encircling the fan blades.

In additional or alternative embodiments of the foregoing methods, the step of coupling a fan to the transmission may include coupling the fan to a fan drive shaft coupled to the transmission.

In additional or alternative embodiments of the foregoing methods, the step of coupling a fan to the transmission may further include coupling, via a bearing, a fan rotor bearing support structure to the fan drive shaft and to the front frame assembly.

In another embodiment, a bearing support for mounting an engine front frame assembly to a bearing assembly is provided. The bearing support includes, among other possible things, a forward mounting flange for mounting to the front frame assembly; and a web extending aftward and radially inward from the forward mounting flange.

In an additional or alternative embodiment of the foregoing bearing support, the bearing support may additionally include a ring structure for mounting the bearing assembly, the web extending aftward and radially inward from the forward mounting flange to the ring structure.

In additional or alternative embodiments of the foregoing bearing support, the forward mounting flange and the web may be part of a single piece that further includes an aft mounting flange to which the ring structure is mounted.

In additional or alternative embodiments of the foregoing bearing support, the bearing may be a duplex bearing and the ring may have an aft portion for mounting an aft bearing of the duplex bearing and a forward portion for mounting a forward portion of the duplex.

In additional or alternative embodiments of the foregoing bearing support, the aft portion may be a separate piece from the forward portion.

In additional or alternative embodiments of the foregoing bearing support, the forward portion may be forwardly cantilevered.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
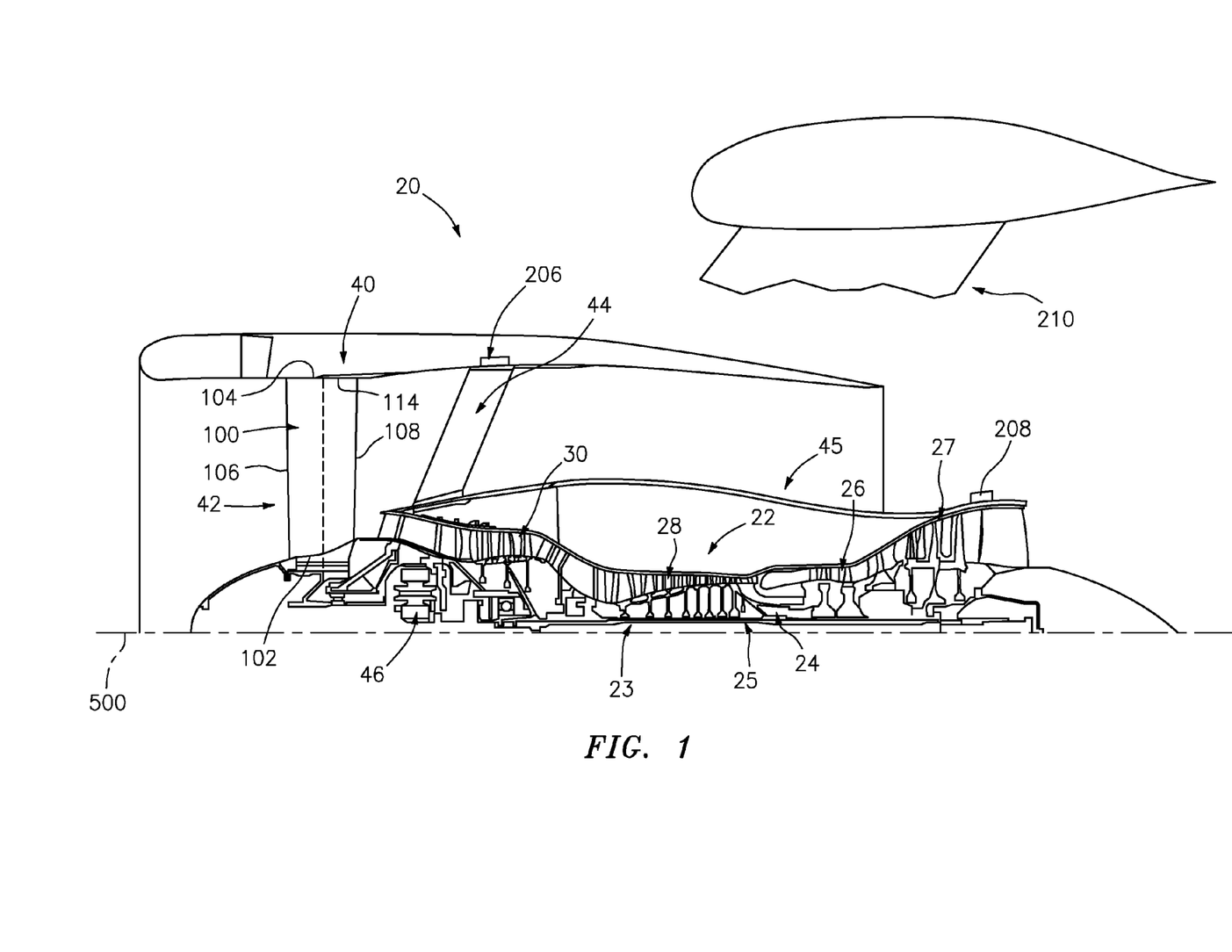
FIG. 1 is a longitudinal axial sectional/cutaway view of an embodiment of a turbofan engine.

FIG. 1 shows an engine based on the configurations shown in U.S. patent application Ser. No. 12/622,535, filed Nov. 20, 2009, and entitled "BELLOWS PRELOAD AND CENTERING SPRING FOR A FAN DRIVE GEAR SYSTEM" and Ser. No. 61/498,515, filed Jun. 17, 2011, and entitled "Fan Rotor Support", the disclosures of which are incorporated by reference in their entireties herein as if set forth at length.

FIG. 1 shows a turbofan engine 20 having an engine case 22 containing a rotor shaft assembly 23. An exemplary engine is a high-bypass turbofan. In such an engine, the normal cruise condition ratio of air mass flowing outside the core (e.g., the compressor sections and combustor) to air mass passing through the core (the bypass ratio) is typically in excess of about 4.0 and, more narrowly, typically between about 4.0 and about 16.0. Via high 24 and low 25 shaft portions of the shaft assembly 23, a high pressure turbine (HPT) section 26 and a low pressure turbine (LPT) section 27 respectively drive a high pressure compressor (HPC) section 28 and a low pressure compressor (LPC) section 30. The engine extends along a longitudinal axis (centerline) 500 from a fore end to an aft end. Adjacent the fore end, a shroud (fan case) 40 encircles a fan 42 and is supported by vanes 44. An aerodynamic nacelle around the fan case is shown and an aerodynamic nacelle 45 around the engine case is shown.

Although a two-spool (plus fan) engine is shown, an alternative variation involves a three-spool (plus fan) engine wherein an intermediate spool comprises an intermediate pressure compressor (IPC) between the LPC and HPC and an intermediate pressure turbine (IPT) between the HPT and LPT.

In the exemplary embodiment, the low shaft portion 25 of the rotor shaft assembly 23 drives the fan 42 through a reduction transmission 46. An exemplary reduction transmission is an epicyclic transmission, namely a planetary or star gear system.

Figure 5:
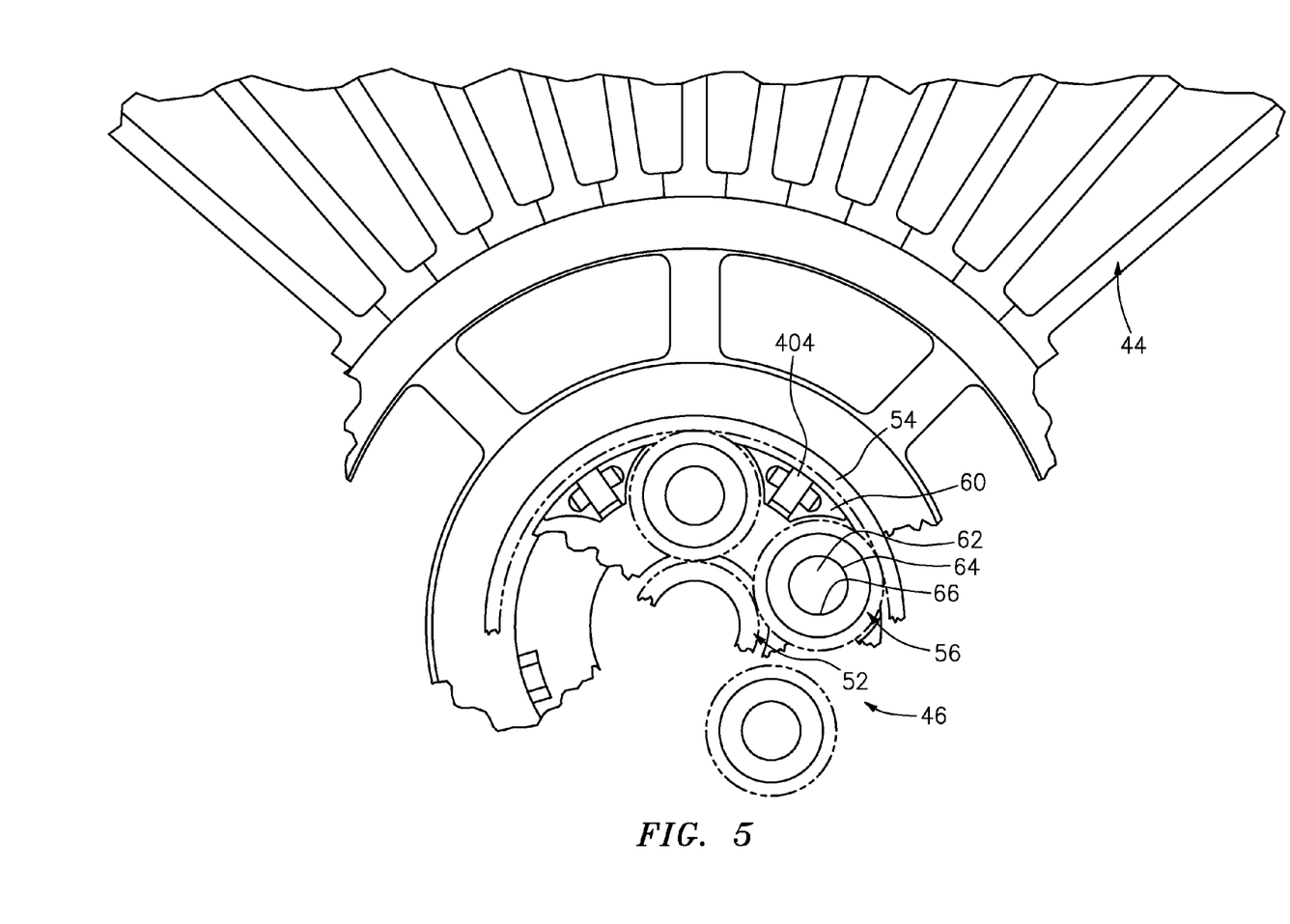
FIG. 5 is partial transverse sectional/cutaway view of a forward portion of the engine of FIG. 1.

FIG. 5 schematically shows details of the exemplary transmission 46. A forward end of the low shaft is coupled to a sun gear 52. The externally-toothed sun gear is encircled by an internally-toothed ring gear 54. The exemplary ring gear is coupled to the fan to rotate with the fan as a unit.

A number of externally-toothed star gears 56 are positioned between and enmeshed with the sun gear and ring gear. A cage or star carrier assembly 60 carries the star gears via associated journals 62. The exemplary star carrier is substantially non-rotatably mounted relative to the engine case 22. The journals have circumferential surface portions 64 closely accommodated within internal bore surfaces 66 of the associated star gears.

Other combinations of which of the sun, star carrier and ring are mounted to the fan, low shaft, fixed structure (case) (or are permitted to rotate freely) are possible.

The speed reduction ratio is determined by the ratio of diameters of the ring gear to the sun gear. This ratio will substantially determine the maximum number of star gears in a given ring. The actual number of star gears will be determined by stability and stress/load sharing considerations. An exemplary reduction is between about 2:1 and about 13:1. An exemplary number of star gears is between about 3 and about 11.

The fan comprises a rotor having a plurality of aerodynamic blades 100 (FIG. 1) arrayed around the centerline 500. The fan provides the primary motive air flow to the gas generator air stream (the core flow) and the fan duct flow (the bypass flow). Air exiting the fan rotor has increased pressure and axial and tangential flow velocity. The bypass flow velocity may be redirected or straightened by the structural guide vanes 44. The fan blade airfoils extend from inboard ends 102 to outboard tips 104, and have a leading edge 106, a trailing edge 108, a pressure side, and a suction side. The tips are in close facing proximity to a rub strip 114 along the interior of the fan case.

At the inboard ends 102, the blades (if separate) are attached to a fan disk 120 (FIG. 2) which transmits torque to the blades and provides support and retention to the blades.

Figure 2:
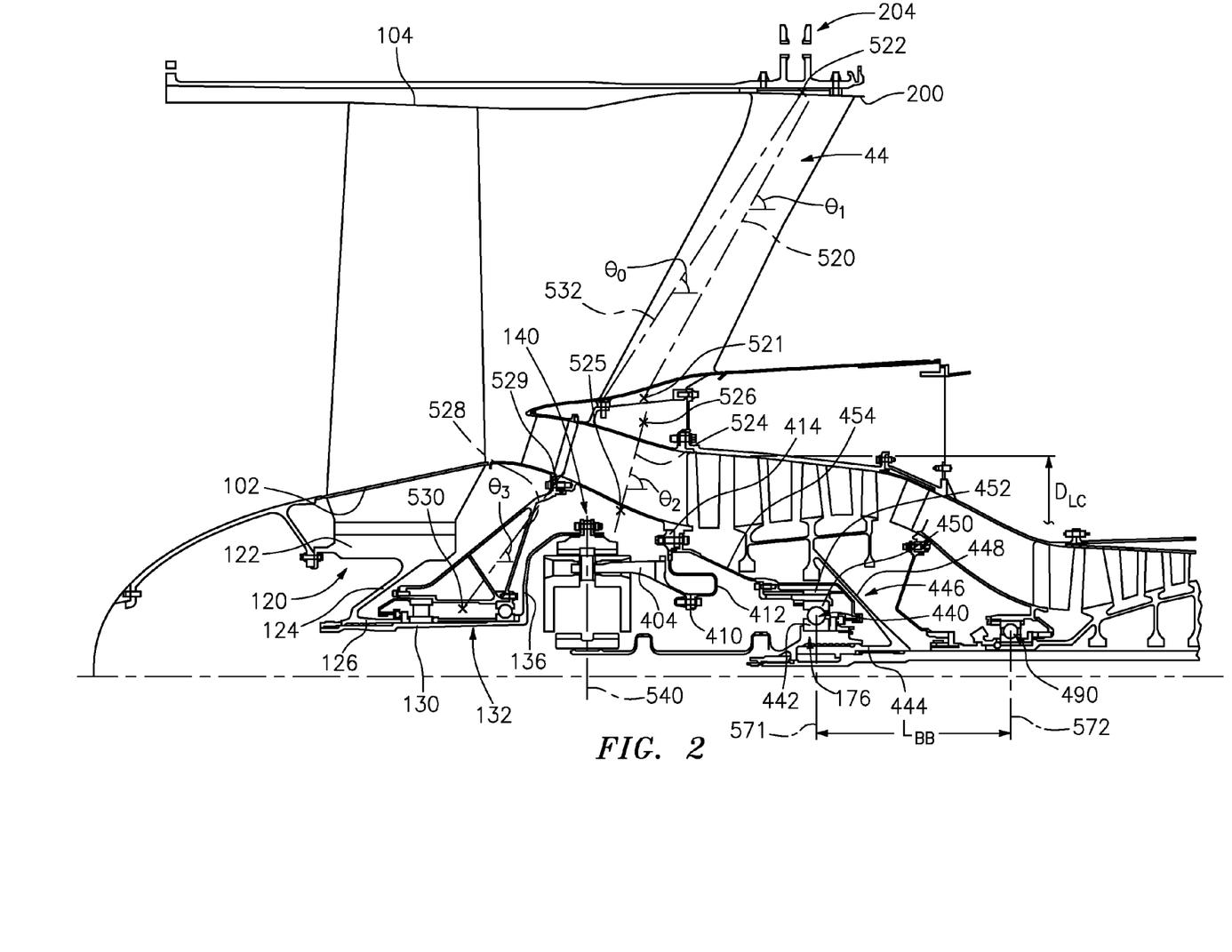
FIG. 2 is a longitudinal axial sectional/cutaway view of a forward portion of the engine of FIG. 1.

The exemplary disk comprises an outer ring 122 to which the blades are attached and a forwardly, inwardly tapering web 124. At its inboard end, the web 124 joins a collar 126 which receives a forward portion of a tubular portion 130 of a fan shaft 132. At a rearward end, the fan shaft tubular portion joins a partially radial web or hub 136 which extends outward and then axially aftward and is secured to a bolting flange 140 on the periphery of the ring gear. As is discussed below, the fan shaft, via this web 136, both receives torque from the LPT (via the transmission) and provides radial and axial positioning to the transmission.

Figure 3:
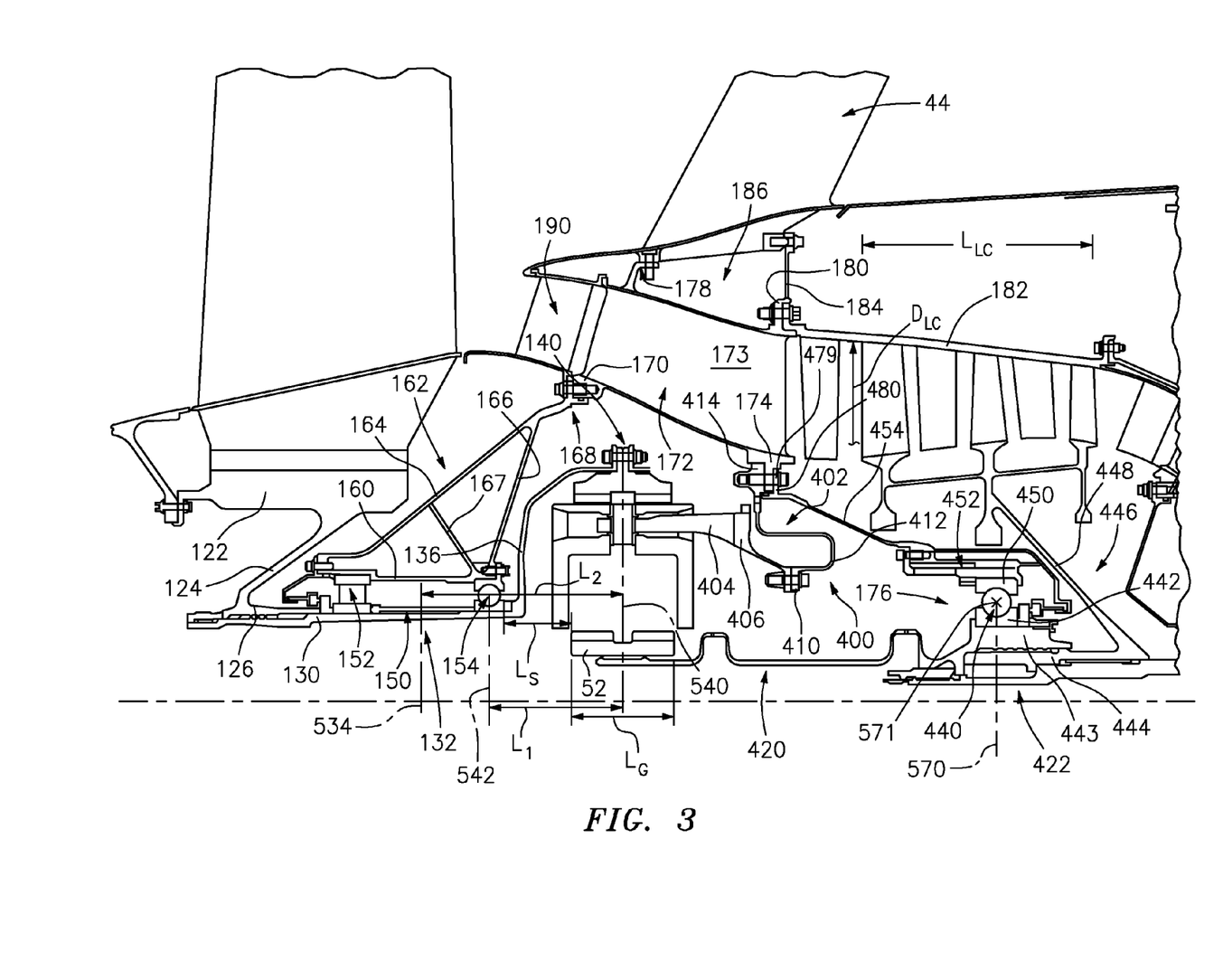
FIG. 3 is a longitudinal axial sectional/cutaway view of a forward portion of the engine of FIG. 1.

As shown in FIG. 3, the fan shaft is surrounded and supported by a duplex bearing system 150 (e.g., having a forward bearing 152 and an aft bearing 154 spaced apart and as described in the '535 application noted above). As in the '535 application, a bellows spring may engage an outer race of at least one of the bearings of the duplex tapered roller bearing. The fan shaft thus joins inner races of the two bearings. The outer races of the two bearings are joined by a tubular radially inboard portion 160 of a fan rotor bearing support structure 162 (forward hub structure). The fan rotor bearing support structure includes a forward web 164 extending outward and aftward from an inboard end of the tubular structure 160 at an exemplary angle in the vicinity of 45°. The aft web 166 extends from an aft end of a tubular portion 160 and also extends aftward and outward but at a more radial inclination. The two webs 164, 166 join at a root of an outboard/aft mounting flange 168. As is discussed further below, the fan rotor bearing support structure 162 supports all degrees of freedom of the fan while allowing rotation about the centerline. FIG. 3 also shows a rearwardly converging web 167 joining the web 164 to a rear inboard end of the web 166 and rear end of tubular structure 160.

The flange 168 is mounted to a mating flange 170 of a front frame assembly 172 (e.g., shown having a circumferential array of struts (e.g., airfoil-shaped structures) 173 substantially smaller in number than the vanes 44). This assembly includes radial struts across the core flowpath. The assembly 172 has an inboard rear bolting flange 174 which, as is described further below, is coupled to the star carrier and to a low shaft forward bearing assembly 176. The assembly 172 has an outboard forward mounting flange 178 to which inboard forward portions of the vanes 44 are mounted. The assembly 172 has an outboard rear mounting flange 180 to which an engine case segment 182 is mounted and which, via a radial web 184, is mounted to inboard rear portions of the vanes 44.

The four-sided (viewed in section) structure 186 formed by the outer structures of assembly 172, inner structures of vanes 44 form an annular box beam often called a torque box. The torque box accumulates loads in all degrees of freedom from the radial core strut assembly 172 and distributes loads in all degrees of freedom to the vane array 44. The torque box structure is especially efficient in transmitting torsion loads about the engine centerline and trunion moments normal to the engine centerline. The torsion and trunion moments place three degrees of bending load into the vane 44 and strut assembly 172 airfoil shaped structures 173. Alternatively torque box 186 could be a three-sided structure.

A structural load path is thus provided through the fan hub support, the frame strut assembly, the array of vanes 44, to the engine case (and, at least in the exemplary embodiment to a pylon 210).

FIG. 3 shows an array of fan exit stator vanes 190 positioned ahead of the fan frame. These remove swirl from exiting from proximal portion to the fan blades. Such vanes may be integrated into the fan frame in alternative implementations.

The exemplary vanes 44 have a characteristic line 520 (FIG. 2) (e.g., a linear fit to the median of the airfoil shape) at an angle $\theta_1$ relative to the engine centerline 500. The exemplary $\theta_1$ is less than 75° relative to the engine centerline, more narrowly, 55-70°. Alternatively defined, an angle in such a range may be along a majority of the leading and/or trailing edges of the vanes or may be along a majority of the axial span of a median. Such an angle may alternatively be characterized as essentially the angle between centers 521 and 522 respectively of inboard and outboard mounting points or of inboard and outboard ends of the airfoil portion of the vane. If the vanes are canted, such an angle may be a projection onto an intersecting axial/radial plane.

A similarly defined line 524 of the front frame strut assembly (passing through a center 525 of inboard flanges of the airfoil shaped structures 173 and a center 526 of outboard flanges thereof) is at an angle $\theta_2$ relative to the engine centerline. Exemplary $\theta_2$ is steeper (e.g., 70-85°).

A line 528 between a location 529 along a mating face of the outboard flange of the fan rotor bearing support and a center 530 (of the axial half section (along bearing transverse centerplane 534) (as shown in FIG. 3) of its bearing system is shown at an angle $\theta_3$ relative to the engine centerline. Exemplary $\theta_3$ is in a similar range to $\theta_1$ above.

A line 532 extends from the bearing center 530 to the location 522 or center of the outboard end of the airfoil of the vane 44. The line is at an angle $\theta_0$ relative to the engine centerline. Exemplary $\theta_0$ is slightly less than $\theta_1$. For example, exemplary $\theta_0$ is about 5° less than $\theta_1$. More broadly, exemplary $\theta_0$ is between 15° less and 5° more than $\theta_1$. An exemplary range is 50-70°.

The combination of angles, most notably $\theta_1$ and $\theta_3$ is such that the force transmission path from the fan bearing system to the fan case stays relatively close to the line 532 (and to the cone represented by revolving that line about the centerline). The line 532 thus locally falls within or nearly within the airfoil of the vane 44 so that fan rotor shear and overturning trunion moments are transmitted in an efficient straight line conical path through vane 44. (e.g., the line 532 does not go more than half of the local chord of the airfoil ahead of the airfoil at any point along the airfoil, more narrowly 20%). Vane 44 is thus load more predominantly in tension or compression. If vane 44 central line 520 is further off the line 532, a given load will induce greater internal bending moments in vane 44. The conical frame structural arrangement therefore, in various embodiments, carries the dominating fan rotor loads more efficiently. The more efficient structure is also stiffer and controls fan blade tip clearances more effectively. Tighter fan tip clearances improve engine performance.

As shown in FIG. 3, centerplane 540 of the gears may be located at a very minimal distance $L_1$ from the rear fan bearing 154 centerplane 542 by sharply curving the fan shaft hub 136. Exemplary centerplane-to-centerplane distance $L_1$ is less than about twice the gears' axial length $L_G$, more narrowly, less than about 1.5 times, with an axial spacing $L_S$ between the adjacent ends of the gears and bearing 154 less than the gear length $L_G$. The centerplane 540 may be a distance $L_2$ aft of the center 534 of the fan bearing system of less than about 3.0 times the gear length $L_G$, more narrowly less than about 2.5 times or about 2.0 times.

Figure 4:
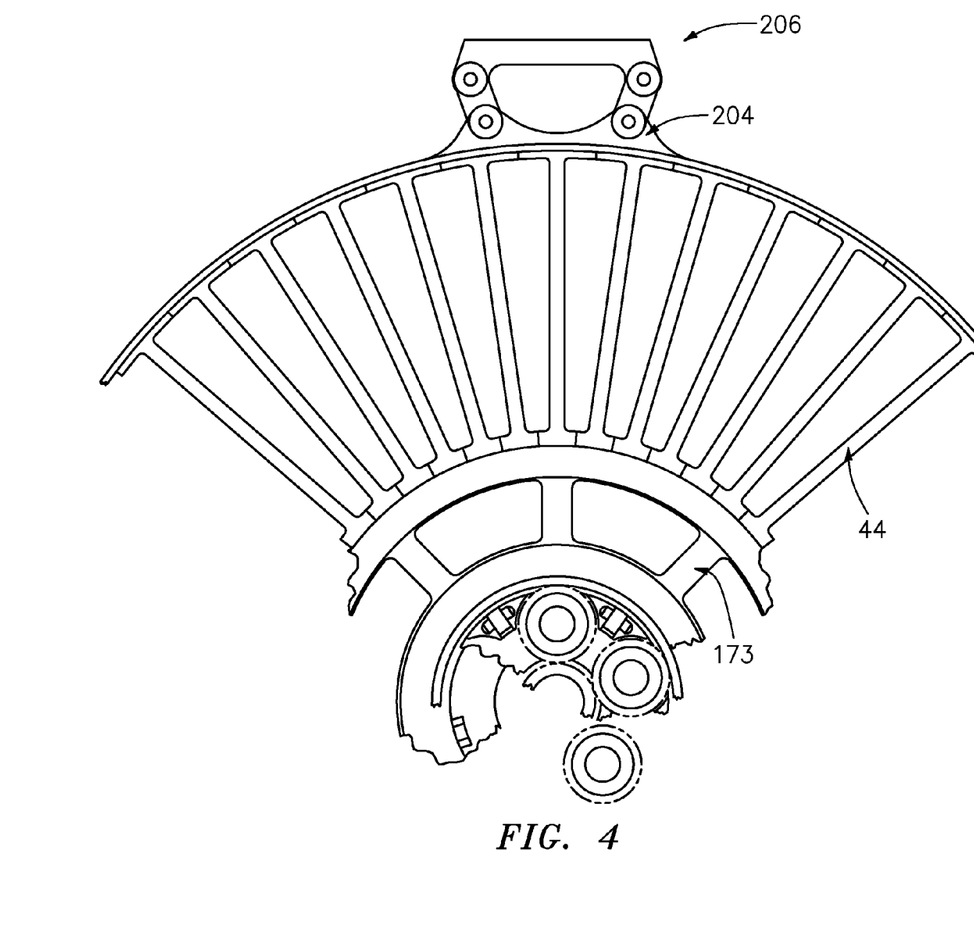
FIG. 4 is partial transverse sectional/cutaway view of a forward portion of the engine of FIG. 1.

At their outboard ends, the vanes 44 have flanges 200 bolted to an inner ring structure of the fan case to tie the outboard ends of the vanes together. Integral therewith or fastened thereto is a forward mounting structure 204 (e.g., clevises which form part of a four bar mechanism 206 (FIG. 4)) and provides forward support to the engine (e.g., vertical and lateral support).

To mount the engine to the aircraft wing, the pylon 210 is mounted to the mechanism 206 (FIG. 4) (e.g., forming the outer part thereof). The pylon is also mounted to a rear engine mount 208.

The exemplary carrier 60 is held by a flanged flexure structure 400 against rotation about the centerline. The exemplary flanged flexure structure 400 comprises a body 402 mounted to the case and a plurality of fingers 404 extending forward from a ring 406 bringing the body 402 into engagement with the carrier 60 (FIG. 5). The exemplary fingers 404 extend into corresponding apertures in the carrier 60 and are secured via radial pinning near their distal ends. Proximal end portions of the fingers are secured to or unitarily formed with the ring 406 which is bolted to an inboard flange 410 of the body. The flexure has a flexible portion 412 extending in convoluted axial cross-section to an outboard flange 414 bolted to the aft inboard flange 174 of the front frame strut assembly. The flexure, via the fingers, thus retains the carrier 60 against all but small (e.g., vibratory level) rotational movements about the axis 500 while allowing the carrier 60 to otherwise accommodate engine distortion due to thrust loads. Thus, the flange structure and its flexure transmit all or the majority of axial retention torque to the star carrier but do not transmit a majority of axial and radial retention forces to the star carrier 60.

A fan drive input coupling 420 couples the sun gear 52 to the forward portion 422 of the low shaft 25. A forward/distal portion of the coupling 420 is received in the bore of the sun and irrotatably secured thereto. The coupling 420 has sufficient axial and radial compliance so that it effectively only transmits torque about the centerline but allows other angular excursions and position excursions.

Radial support of the low shaft is provided by a plurality of bearing systems. The exemplary forwardmost bearing assembly 176 is a thrust bearing system near the forward end of the shaft. The exemplary thrust bearing system includes a bearing 440 that has an inner race 442 mounted to and encircling a proximal portion 443 of the fan drive input coupling 420 at a forward end of the low shaft. A collar 444 of a hub 446 of the LPC rotor is sandwiched between the shaft and the input coupling proximal portion. The web 448 of the hub 446 extends radially outwardly and forwardly from a junction with an aft end of the collar 444 to join with a web of a disk (the middle of three disks in the example) of the LPC rotor. The outer race 450 of the bearing assembly 176 is mounted to a ring structure 452. A bearing support in the form of a shallow web 454 extends forward and outward from a bolted joint with the ring structure to the bolted joint with the inboard aft flange 174 of the front frame strut assembly. The exemplary web 454 is relatively shallow (e.g., at 10-45° off axial, more narrowly, or 10-40° or 10-35° o 20-40° or)20-35°. Similar angular ranges may exist for angles measured between the center of the forward bolt circle 479 (FIG. 3) of flange 480 or other mounting feature of the bearing support at the forward/outboard end of the web 454 and the center 571 of the individual bearings of the bearing 440 (e.g., the intersection of their rotational axes with the centerplane 570 of the bearing 440 as a whole). The centerplane 570 of the bearing 440 (FIG. 3) may be within an aft half of the longitudinal span $L_{LC}$ of the LPC rotor (e.g., measured between forward and aft extremities of the first and last stage blades thereof).

The tapering of the hub/web 454 helps facilitate longitudinal compactness by allowing the bearings 440 to be shifted aft and make longitudinal room for the transmission and coupling 420, etc. This may have the effect of shifting the bearings 440 further longitudinally into the low pressure compressor (LPC) section (e.g., so that the centerplane of the bearing 440 may fall within the LPC and, more narrowly, even within the hub 446 and its web 448). Alternatively, at least some portion of the bearing structure will be within the web 448 if not the bearing centerplane. The tapering of the web 448 also facilitates this. In the example, the entire bearing assembly 176 is longitudinally within the LPC rotor.

The various features above and further features below may be implemented in the contexts of reengineering a given directly-driven turbofan engine to add a transmission, reengineering a turbofan engine already having a transmission or reengineering a non-turbofan engine to become a turbofan (e.g., using an existing engine configuration as the basis of the turbofan's gas generator). Relative to a baseline directly-driven turbofan, use of a reduction transmission may allow reduction of engine turbomachinery stage count by allowing the fan to rotate at lower speeds than the LPT. It also permits larger fan diameters, higher engine propulsive efficiency, and lower noise. It also adds complexity to the engine shaft and bearing compartment arrangement. The higher bypass ratio of the larger fan permits a smaller gas generator. Increase in rotor system complexity in conjunction with reduced axial and radial space inside the turbomachinery creates bearing compartment packaging challenges.

The presence of the transmission softens the trunion stiffness between the fan rotor and the low shaft. The engine propulsor (fan rotor, transmission, fan frame, and fan containment case) may, in some engines, comprise half the turbomachinery weight. The propulsor deflects under load as a unit and moves somewhat independently from the gas generator (compressor(s), combustor, turbine(s)). Flexible input shaft coupling and static gear carrier supports are used to isolate these deflections. However excessive deflection in these flexures can cause high cycle fatigue in the flexures and impart increased misalignment loads into the transmission.

The tolerance loop between the low shaft and the sun gear can become quite large if the low shaft is supported through the intermediate frame, LPC, and the front frame. This tolerance offset introduces a constant lateral load the FDGS flexible structures.

If the low shaft is supported through the intermediate frame, the intermediate frame bearing compartment might otherwise require a significant length increase to accommodate the associated components (e.g., accessory drive tower shaft, two bearings, two oil seals to the static structure and one intershaft oil seal). Intershaft oil seals can be unreliable at the high speeds of the small gas generator. The size of this bearing compartment can become quite large and set the length of the turbomachinery in this engine region.

The front frame 172 supports fan thrust and radial loads via the forward hub structure 162 and low shaft thrust and radial loads via the bearing support 454. By supporting the front end of the low shaft directly through the front frame, the low shaft is forced to deflect with the front frame and the remainder of the propulsor. Reduction in the slope and lateral deflections reduces gear mesh wear forces and improves the high cycle fatigue life of the flexible input shafting. Lateral deflections of the sun gear are matched by lateral deflections of the low shaft. The low rotor thrust bearing 440 provides significant trunion stiffness between the low shaft and the bearing support 454. As the low shaft bearing support 454 is rotated by the front frame 172, the front end of the low shaft is forced to bend and maintain slope alignment with the sun gear 52.

Likewise, supporting the front end of the low shaft directly onto the front frame may reduce the number of parts in the tolerance loop between the low shaft and the sun gear. The tolerance mismatch is a constant offset in the flex system that wears the gear teeth and fatigues the flex systems whenever the engine is turning. Improved alignment increases transmission durability.

In various reengineering embodiments, placing the low shaft bearing support on the front frame shortens the engine length and simplifies the oil sealing system (e.g., one statically supported oil seal and one very high speed counter rotating intershaft seal are eliminated from the engine; the LPC rotor hub can be moved aft under the intermediate frame, because the seals are eliminated and the bearing moved in front of the compressor hub). Placement of the LPC hub further aft allows the transmission and the flexible coupling system to move aft. The length of the engine is then set by the aerodynamic constraints of the flowpath and not the underlying rotor structure. The oil sealing durability, reliability, and oil system heat loads may be improved by the seal elimination.

With the low shaft supported by the front frame, there may be the flexibility that the propulsor unit can be disassembled with or without the LPC attached. This flexibility may allow faster access to the both the low and high rotor front bearing compartments, thereby improving assembly, disassembly, and engine maintenance.

The tapering of the web 454 may reduce stiffness. In various embodiments, it may be desirable to stiffen the rotor to raise the natural frequency of the shaft. As is discussed further below, several embodiments involve replacing the bearing assembly 176 with a duplex or modifying it to be duplexed. This duality helps increase the stiffness of interaction between the fixed engine structure (via the web 454) and the front end of the low pressure shaft. The duality thus increases the slope fixity of that end of the shaft which in turn raises the rotor dynamic natural frequency of the engine system and provides more margin.

Figure 6:
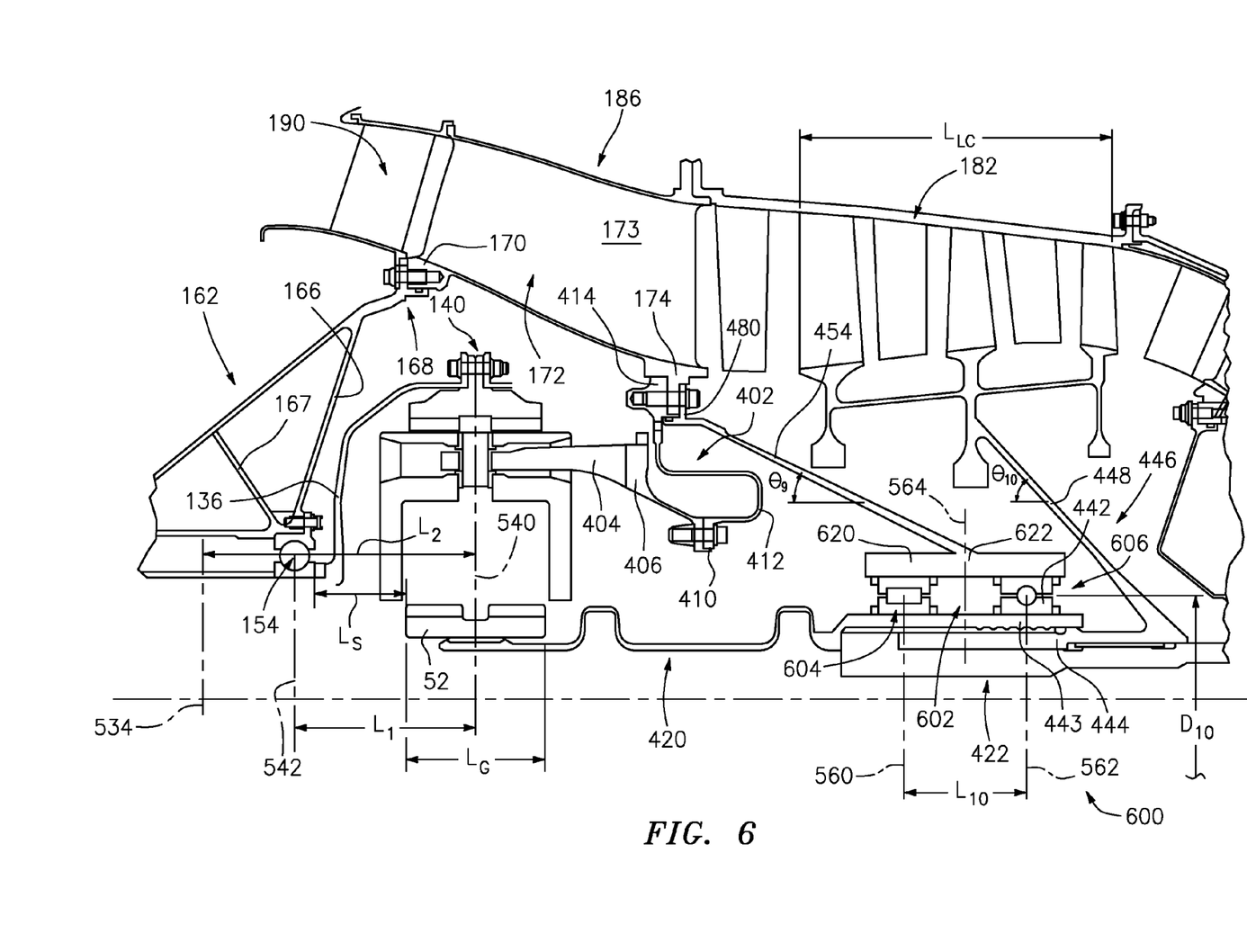
FIG. 6 is a longitudinal axial sectional/cutaway view of a forward portion of an alternate engine embodiment.

Thus, FIG. 6 shows an alternate engine 600 which may be otherwise similar to the engine 20. The exemplary engine 600 replaces the bearing assembly 176 with a duplex bearing system 602. The duplex bearing system 602 having a forward bearing 604 (e.g., roller bearing) and an aft bearing 606 (e.g., thrust bearing or ball bearing) having respective centerplanes 560 and 562 and defining a centerplane 564 of the system 602.

Each of the bearings 604 and 606 has a respective inner race mounted to the proximal portion 443 as discussed above and an outer race mounted to a ring structure 620. The web 454 joins the ring structure 620 at a junction 622. FIG. 6 further shows the web 454 at a characteristic angle $\theta_9$ tapering inwardly rearwardly. $\theta_9$ may be an average or local value of the web structure or may be along a force line between the junction 622 and the flange 174. Similarly, the angle of the hub 446/web 448 is shown as $\theta_{10}$. Exemplary $\theta_9$ is 10-45°, more narrowly, 10-35° or 15-30°. Exemplary $\theta_{10}$ is greater/steeper than $\theta_9$ (e.g., at least 5° steeper and an exemplary 20-60° or 35-50°).

FIG. 6 further shows a characteristic length $L_{10}$ of the duplex bearing system defined between the centerplanes 560 and 562. A characteristic diameter of the duplex bearing may be defined by the intersections of the rotational axes of the individual bearing elements with these planes (e.g., an average of the two if different). This average location at the centerplane 602 would also define a center of the half section of the bearing system. Alternatively, the diameter $D_{10}$ may be defined by the outer diameter or inner diameter of the races of such bearings if convenient. These will be expected to be small departures from each other. An exemplary ratio of the bearing length $L_{10}$ to diameter $D_{10}$ is between about 0.4:1 and about 3:1.

In this example, it is also seen that the entire duplex bearing system falls axially within the LPC rotor (e.g., the fore end of the bearing system is aft of the plane of the leading disk of the LPC). Furthermore, in this embodiment, the bearing system centerplane 564 is similarly within the LPC and within or close to within the web 448. The centerplane 562 is within the web 448. Similar to the centerplane 570 of the bearing 440, the centerplane 564 of the bearing system 602 or at least the centerplane 562 of the aft bearing 606 may be in that rear half or even rear third of the longitudinal span $L_{LC}$. The centerplane 560 of the forward bearing 604 may, however, more likely be in a forward half of the longitudinal span $L_{LC}$.

The aftward positioning of the bearing 440 or its duplex counterparts may also affect positional relationships relative to other bearings of the engine. In a reengineering situation, for example, this may reduce the relative longitudinal separation between the bearing system 440 (or the center of a duplex or the aft bearing of a duplex) and the next aft bearing (e.g., the centerplane 572 of the high spool bearing 490 (FIG. 2)). This may be characterized relative to a local engine diameter such as the ratio of the low pressure compressor outer diameter (OD) (e.g., a diameter $D_{LC}$ at the tips of the outboardmost blades of the LPC) to the bearing-to-bearing distance $L_{BB}$ (FIG. 2) measured either between the plane of the single bearing 440 and the plane 572 or between the centerplane of the duplex or the aft bearing plane of such a duplex and the plane 572. Exemplary values of this ratio are at least 2.0, more particularly, at least 2.1.

As noted above, such a duplex ball and roller bearing system at the front end of low shaft may, in various embodiments, provide increased overturning trunion stiffness to the end of the LPC shaft and improve alignment. Increased trunion stiffness will improve airfoil tip clearance closures (e.g., of the LPC blades) and increase rotor natural frequencies and reduce rotordynamic strain energy and allow for increased damper functionality. Axial deflections due to the opposite sense of the fan rotor thrust load and the low rotor blow off loads are reduced with the close coupling of the axial load path between the fan rotor and low shaft bearing supports.

Increasing the separation between the ball and roller duplex system (see one example in FIG. 7) may, in various embodiments, further increase the trunion stiffness benefit. Alternatively or additionally, introduction of a duplex tapered roller system (see FIG. 8) may, in various embodiments, likewise increase trunion stiffness over a similarly spaced ball and roller system.

As noted above, the internal cavity created by the single conical hub (446/448) supported low pressured compressor and the fan drive gear support flexural drive (coupling 420) may allow axial and radial space for the introduction of the duplex bearing system. Additionally, the low rotor in a geared turbofan system may, in various embodiments, spin 2 to 5 times faster than a conventional turbofan. The increased angular velocity of the geared turbofan high speed LPC will have increased a maneuver gyroscopic moments and deflections. The increased speed of the low shaft (as compared to conventional LPCs) will need higher natural frequencies to keep high strain energy modes out of the engine operating rotor speed range. A duplex bearing system in front of the rotor can in various embodiments provide the increase trunion stiffness need to resolve these issues. Thus, these features may be particularly useful in reengineering of engines which involve increase of LPC speed (e.g., via the addition or modification of transmissions). Thus, although the features described in the embodiments above and those in the embodiments below reflect one particular baseline engine, these features may be implemented in other baseline engines or in clean sheet designs with differences in the particular arrangements of LPC and other stages, particular fans, particular transmissions, and other structures coupling and supporting these components/systems.

Figure 7:
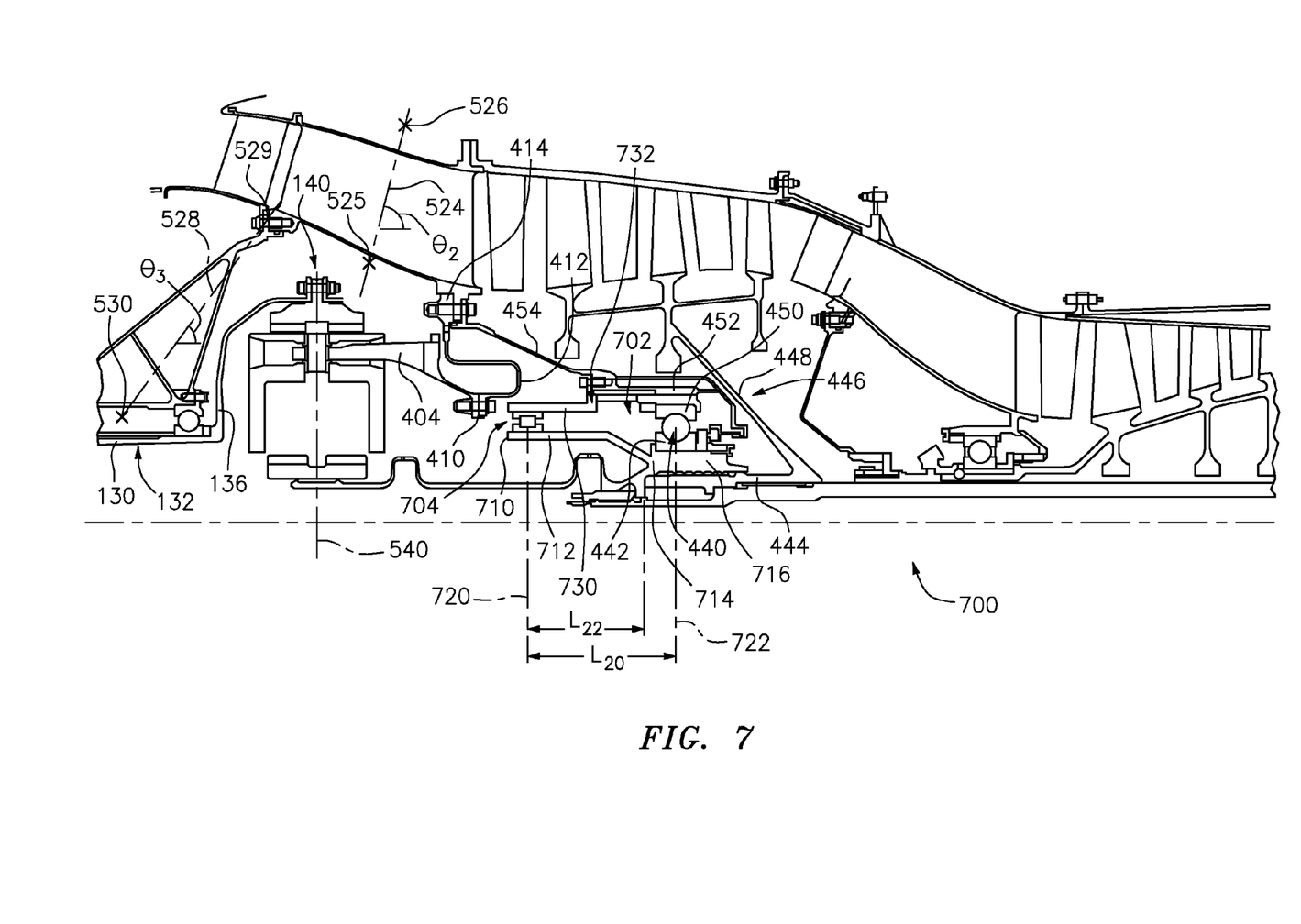
FIG. 7 is a longitudinal axial/sectional cutaway view of a forward portion of a second alternate engine embodiment.

FIG. 7 shows one example yet an alternate engine 700 wherein a duplex bearing system 702 is formed by adding an additional bearing 704 mechanically in parallel with the bearing 440 and both supported by the shallow web 454. The inboard race 710 of the bearing system 704 is longitudinally cantilevered near the free forward end of a support 712 extending forward from a root/junction 714 of a supporting member 716 at the forward end of the generally rigid low shaft and encircling a forward portion of the collar 444. A length of the bearing system $L_{20}$ may be defined between centerplanes 720 and 722 of the two bearing systems of the duplex bearing 702 and other dimensions may be as defined for the previously discussed duplex bearings. A cantilever length $L_{22}$ may be defined as a length between the root 714 and the centerplane 720. The cantilevering may, in various embodiments, allow axial overlap between the duplex bearing and the flex shaft which may form the fan drive input coupling. For example, the exemplary support 712 has a radially forwardly/outwardly divergent proximal portion and joining a longitudinal portion which extends to the forward end and supports the bearing inner race. The divergence of the proximal portion allows it to clear a local convolution in the coupling 420. This allows a relatively greater length $L_{20}$ in a given overall engine length. In this exemplary embodiment, a greater length may allow greater stiffness of support of the front end of the low shaft. In some embodiments, the two bearing systems of the duplex system may have a difference in diameter across the engine centerline (e.g., if needed to accommodate various other components of the engine).

In the exemplary engine 700, the outer race of the forward bearing system 704 of the duplex bearing 702 is also cantilevered on a support 730 extending forward from a junction 732 with an aft/inboard end of the web 454. It is seen that in this particular example, the forward bearing system 704 and its centerplane 720 protrude forward of the LPC rotor while the aft bearing 440 and aft end of the web 454 fall within the LPC rotor (the aft bearing 440 being positioned similarly to FIG. 3).

Figure 8:
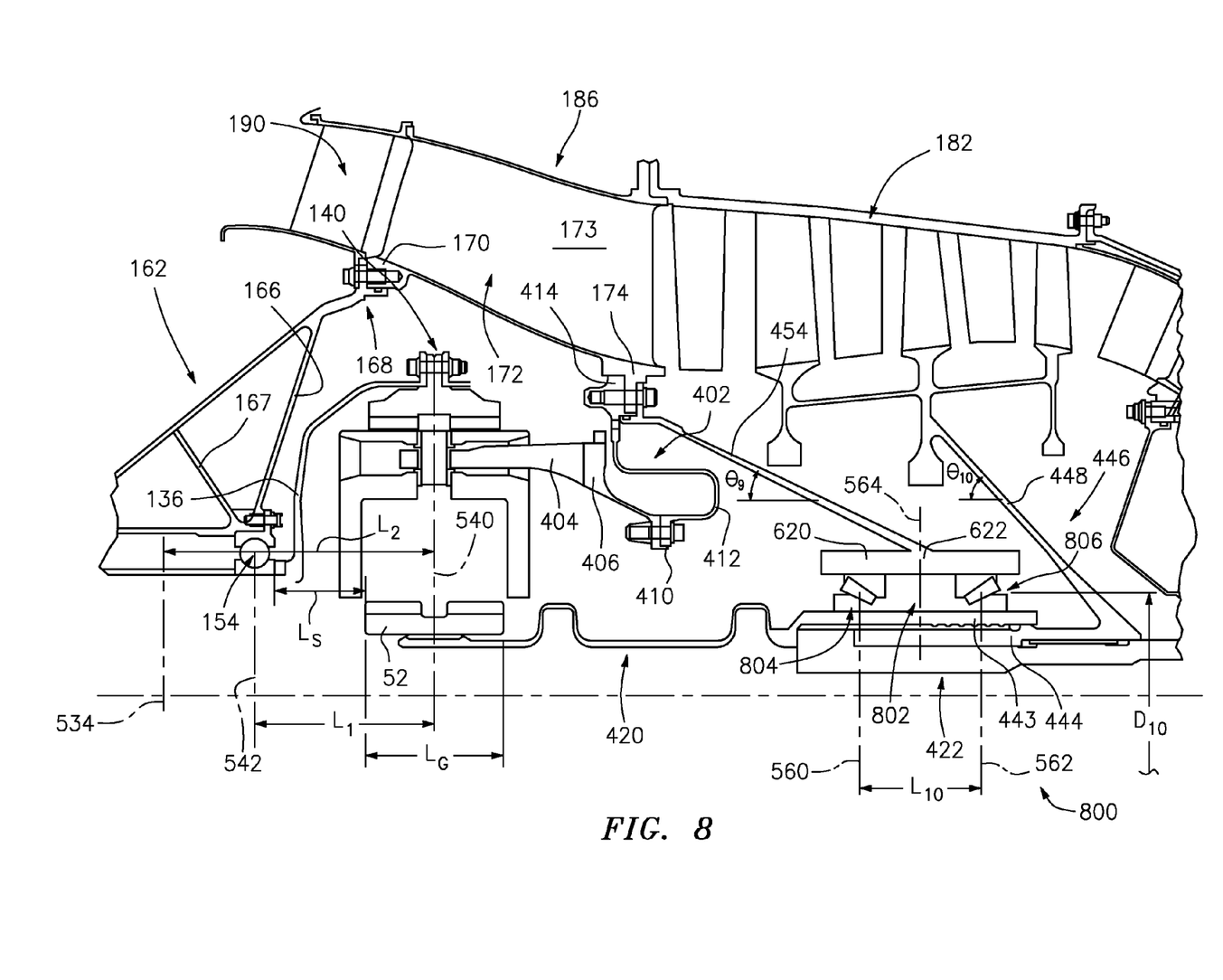
FIG. 8 is a longitudinal axial/sectional cutaway view of a forward portion of a third alternate engine embodiment.

FIG. 8 shows one embodiment of an alternate engine 800 otherwise similar to the engine of FIG. 6 except that the ball and roller duplex bearing system is replaced with a dual tapered roller duplex bearing system 802 (with forward bearing 804 and aft bearing 806). Otherwise, dimensions, operation, and manufacture may be the same as those of the FIG. 6 embodiment. In exemplary embodiments, the duplex tapered bearing system may be stiffer in the trunion direction than a similarly sized/positioned ball bearing/roller bearing duplex combination.

One or more embodiments have been described. Nevertheless, it will be understood that various modifications may be made. For example, when implemented in the reengineering of a baseline engine, details of the baseline may influence details of any particular implementation. Accordingly, other embodiments are within the scope of the following claims.

What is claimed is:

1. A turbofan engine comprising:
an engine case;
a gaspath through the engine case;
a fan having a circumferential array of fan blades;
a fan case encircling the fan blades radially outboard of the engine case;
a plurality of fan case vanes extending outward from the engine case to the fan case;
a front frame assembly comprising a plurality of vanes extending radially across the gas path;
a shaft;
a transmission coupling the shaft to a fan shaft to drive the fan;
a duplex bearing assembly coupling the shaft to the front frame assembly; and
a bearing support extending aftward and radially inward from the front frame assembly to the bearing assembly, wherein:
the duplex bearing comprises a forward bearing and an aft bearing;
the forward bearing has a center spaced apart from a center of the aft bearing by a bearing distance; and
the forward bearing has an inboard race longitudinally cantilevered by a cantilever distance at least about 20% of said bearing distance.

2. The engine of claim 1 wherein:
the bearing support extends partially within a hub of a compressor; and
the compressor is a low pressure compressor (LPC) having a single hub.

3. The engine of claim 1 wherein:
the shaft is a low pressure/speed spool shaft.

4. The engine of claim 1 wherein:
the shaft is a flex-shaft.

5. The engine of claim 1 wherein:
the bearing support has a main portion tapering at an angle of 10-45° off-axial.

6. The engine of claim 1 wherein:
the bearing support has a main portion tapering at an angle of 10-35° off-axial.

7. The engine of claim 1 wherein:
the bearing assembly has a centerplane within an aft half of a longitudinal span of the LPC.

8. The engine of claim 7 wherein:
the bearing centerplane falls within the hub.

9. The engine of claim 2 wherein:
the duplex bearing comprises a forward bearing and an aft bearing;
the forward bearing has a center spaced apart from a center of the aft bearing by a bearing distance; and
the duplex bearing has a characteristic diameter, a ratio of said bearing distance to said characteristic diameter being between about 0.4:1 and about 3:1.

10. The engine of claim 1 wherein:
the forward bearing has an outboard race longitudinally cantilevered by a second cantilever distance at least about 20% of said bearing distance.

11. A turbofan engine comprising:
an engine case;
a gaspath through the engine case;
a fan having a circumferential array of fan blades;
a fan case encircling the fan blades radially outboard of the engine case;
a plurality of fan case vanes extending outward from the engine case to the fan case;
a front frame assembly comprising a plurality of vanes extending radially across the gas path;
a shaft;
a transmission coupling the shaft to a fan shaft to drive the fan;
a duplex bearing assembly coupling the shaft to the front frame assembly; and
a bearing support extending aftward and radially inward from the front frame assembly to the bearing assembly, wherein:

the duplex bearing comprises a forward bearing and an aft bearing;

the forward bearing has a center spaced apart from a center of the aft bearing by a bearing distance; and an inboard support at a center of the bearing distance is longitudinally cantilevered by a cantilever distance at least about 10% of said bearing distance.

12. The engine of claim 11 wherein:

the duplex bearing comprises a forward bearing and an aft bearing; and the forward bearing and aft bearing are both tapered roller bearings.

13. The engine of claim 10 wherein:

a fan bearing assembly couples a forward hub structure to the fan shaft; and the fan bearing assembly is a duplex tapered roller bearing assembly and a bellows spring engages an outer race of at least one of the bearings of the duplex tapered roller bearing.

* * * * *